United States Patent Office 3,063,999
Patented Nov. 13, 1962

3,063,999
5-ACYLAMINOHEXAHYDROPYRIMIDINES AND CARBOXYLIC ACID SALTS THEREOF
Ralph B. Thompson, Hinsdale, Ill., assignor to Universal Oil Products Company, Des Plaines, Ill., a corporation of Delaware
No Drawing. Filed Mar. 8, 1960, Ser. No. 13,457
8 Claims. (Cl. 260—256.4)

This is a continuation-in-part of my copending application Serial No. 525,374, filed July 29, 1955, now Patent No. 2,953,444, September 20, 1960, and relates to novel compositions of matter.

The novel compositions of the present invention are useful in the stabilization of hydrocarbon oils which normally tend to undergo deterioration in storage. Various hydrocarbon oils undergo deterioration in storage and become discolored, form sediment and undergo undesirable reactions.

While the present invention is utilizable for the stabilization of gasoline, it is particularly useful for the stabilization of oils heavier than gasoline. A particular use of the present invention is in the stabilization of middle oils which are marketed under various trade names such as fuel oil, furnace oil, burner oil, diesel fuel, etc., and are selected to meet commercial specifications. In general, these oils have initial boiling points ranging down to about 400° F. or lower and end boiling points which may range up to about 750° F. or higher. In another embodiment, the present invention is used for the stabilization of lubricating oils.

The present invention also is useful for the stabilization of jet fuels which have initial boiling points which may range as low as 100° F. and end boiling points within the range of from about 450° to about 600° F. or higher. Still another particular use of the present invention is in the stabilization of residual oils which are of higher boiling ranges and which tend to form sediment in storage.

Referring to the middle oils which are used primarily for heating purposes or as diesel fuels, these oils generally comprise straight run distillates, catalytic and non-catalytic cracked cycle oils, or mixtures thereof. The term "cycle oil" is used because the oil is separated from a fraction which otherwise would be recycled for further cracking. The cycle oils and mixtures thereof with straight run distillates appear to be less stable and undergo excessive discoloration and sediment formation. Discoloration is undesirable because many of these oils are marketed on the basis of a color specification and the discolored oils cannot meet this specification. Furthermore, sediment formation in these oils is objectionable because the sediment will plug strainers, burner tips, injectors, etc., when used for heating purposes, and also will tend to form varnish and sludge in cylinders of diesel engines when used as diesel fuel.

In one embodiment the present invention relates to acylaminohexahydropyrimidine.

In a specific embodiment the present invention relates to a 5-acylaminohexahydropyrimidine.

A preferred acylaminohexahydropyrimidine for use in the present invention comprises a 5-acylaminohexahydropyrimidine. These compounds are suitably prepared by the reaction of one mol of nitroparaffin, two mols of primary amine and three mols of formaldehyde. The resultant 5-nitrohexahydropyrimidine is reduced to the corresponding 5-aminohexahydropyrimidine and then is reacted with a suitable carboxylic acid to form the corresponding 5-acylaminohexahydropyrimidine. Preferably, the acylaminohexahydropyrimidine contains hydrocarbon substituents and still more particularly alkyl and/or cycloalkyl substituents in the 1- and 3-positions, as well as in the 5-position. In some cases, one or more of these substituents may be hydroxyalkyl, dialkylaminoalkyl, furfuryl, dioxacycloalkyl, etc.

A particularly preferred additive for use in the present invention comprises 1,3-dicyclohexyl-5-methyl-5-octadecenoyl-aminohexahydropyrimidine. This additive is prepared from 1,3-dicyclohexyl-5-methyl-5-nitrohexahydropyrimidine which, in turn, is prepared by the reaction of one mol of nitroethane, two mols of cyclohexylamine and three mols of formaldehyde, preferably in the presence of a solvent such as benzene, methanol, ethanol, etc. This reaction readily is effected by commingling the mixture, preferably with cooling to maintain the temperature at about 10° C., and agitating the mixture for a sufficient time to complete the reaction, followed by separation of the reaction products.

The substituents in the 1- and 3-positions are determined by the primary amine used in the preparation of the hexahydropyrimidine. Thus, in the above example, two mols of cyclohexylamine were utilized and this, in turn, resulted in cyclohexyl substituents in the 1- and 3-positions. The substituent in the 5-position is determined by the particular nitroparaffin utilized. Thus, in the above example, nitroethane was utilized and this resulted in a methyl substituent in the 5-position, the other carbon atom of the nitroethane becoming the 5 carbon atom in the hexahydropyrimidine ring. It is understood that when primary alkyl amines are used in place of cyclohexylamine, the substituents in the 1- and 3-positions will be alkyl substituents. Primary alkyl amines include methyl amine, ethyl amine, propyl amine, butyl amine, amyl amine, hexyl amine, heptyl amine, octyl amine, nonyl amine, decyl amine, undecyl amine, dodecyl amine, etc. It is understood that these amines are set forth for illustrative purposes only and that other suitable amines, including those containing other non-hydrocarbon substituents, may be employed, the important limitation being that the amine is a primary amine.

Similarly, any suitable nitroparaffin may be employed. Other nitroparaffins include nitropropane, nitrobutane, nitropentane, nitrohexane, nitroheptane, nitrooctane, nitrononane, nitrodecane, nitroundecane, nitrododecane, etc.

As hereinbefore set forth, the nitrohexahydropyrimidine, prepared in the above manner, is reduced to the corresponding aminohexahydropyrimidine and then is condensed with a suitable reactant to form acylaminohexahydropyrimidine. The reduction may be effected in any suitable manner and is readily accomplished by reacting the nitrohexahydropyrimidine with hydrogen in the presence of a suitable catalyst, including nickel, platinum, palladium, etc. This reaction is effected at room temperature or at an elevated temperature which generally will not exceed about 300° F. and at superatmospheric pressure which may range up to 1000 pounds per square inch or more.

In a preferred method, the aminohexahydropyrimidine is reacted with a monocarboxylic acid to form the acylaminohexahydropyrimidine. Monocarboxylic acids include formic, acetic, propionic, butyric, valeric, trimethylacetic, caproic, heptylic, capric, lauric, myristic, palmitic, stearic, arachidic, behenic, lignoceric, cerotic, etc., decylenic, palmitoleic, oleic, ricinoleic, petroselinic, vaccenic, linoleic, linolenic, eleostearic, licanic, parinaric, gadoleic, arachidonic, cetoleic, erucic, etc. It is understood that these specific acids are set forth for illustrative purposes and that any suitable monocarboxylic acid may be employed, as well as a mixture thereof. In some cases, mixtures of carboxylic acids are recovered as a by-product and, therefore, are available at a lower cost.

Such mixtures may be employed and in many cases are preferred. When a saturated carboxylic acid is used, the product will be an alkanoylaminohexahydropyrimidine and, when an unsaturated carboxylic acid is used, the product will be an alkenoylaminohexahydropyrimidine.

In another embodiment of the invention, dibasic carboxylic acids may be reacted with the aminohexahydropyrimidine and, in such case, the product will be a bis-acylaminohexahydropyrimidine. Dibasic carboxylic acids include oxalic, malonic, succinic, glutaric, adipic, pimelic, suberic, azelaic, sebacic, etc., as well as mixtures of dibasic acids, particularly those recovered as a by-product and therefore available at lower costs. One such mixture comprises a mixed by-product acid being marketed commercially under the trade name "VR–1 Acid" and is believed to contain an average of about 36 carbon atoms per molecule. Another by-product acid, dimer acid, is available under the trade name of "Empol 1066." In still another embodiment of the invention, tribasic carboxylic acids may be employed, for example, hemimellitic acid, trimellitic acid, etc., or higher carboxylic acids including, for example, prehnitic acid, mellophanic acid, pyromellitic acid, mellitic acid, etc.

The condensation of the aminohexahydropyrimidine and carboxylic acid may be effected in any suitable manner. This reaction is readily effected by refluxing the mixture, preferably in the presence of a suitable solvent such as toluene, xylene, etc., and continuing until the theoretical amount of water of condensation is evolved from the reaction. After completion of the reaction, the products are cooled and the solvent removed by distillation.

In a specific embodiment of the present invention, the acylaminohexahydropyrimidine is illustrated by the following general formula:

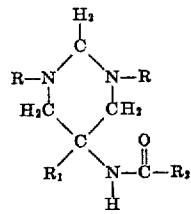

wherein R and $R_2$ are alkyl and $R_1$ is lower alkyl. By lower alkyl I mean methyl, ethyl, propyl and butyl.

In another embodiment of the invention, the carboxylic acid salts of the acylaminohexahydropyrimidines may be employed. These salts are readily prepared by suitably mixing the acylaminohexahydropyrimidine with the desired carboxylic acid. Care should be observed that the temperature of mixing is below that at which condensation reactions with the evolution of water occur. Either a mono- or polycarboxylic acid may be employed, as desired, and the acid may be selected from those hereinbefore set forth or from other suitable carboxylic acids.

It is understood that the various additive compounds which may be prepared and used in accordance with the present invention are not necessarily equivalent either in the manufacture thereof, or in their potency in the same or different hydrocarbon oils. However, all of them will be effective in preventing discoloration and/or sediment formation in some hydrocarbon oils.

The additive of the present invention is employed in the hydrocarbon oil in a small but sufficient concentration to obtain the desired stabilization. In general, it is used in an amount of less than about 1% by weight and may range from a concentration of 0.0001% to about 1% by weight, and preferably from about 0.001% to about 1% by weight. It is understood that these additives may be used alone or in conjunction with other additives employed for specific purposes such as, metal deactivators, antioxidants, preferably of the phenolic type, synergists, rust inhibitors, cetane improvers, etc.

The following examples are introduced to illustrate further the novelty and utility of the present invention but not with the intention of unduly limiting the same.

EXAMPLE I

The additive used in this example is 1,3-dicyclohexyl-5 - methyl - 5 - octadecenoyl - aminohexahydropyrimidine. This compound was prepared by the method hereinbefore set forth, utilizing distilled tall oil acid (comprising chiefly a mixture of oleic and linoleic acids) for reacting with 1,3-dicyclohexyl-5-methyl-5-aminohexahydropyrimidine. The product was a viscous liquid having a dark brown color.

The additive prepared in the above manner was utilized in a concentration of 0.005% by weight in a catalytically cracked cycle oil which is marketed as a fuel oil. The beneficial effects obtained by the use of the additive were determined by means of a number of different methods. In one method a sample of the fuel oil without additive is stored at 100° F. for 6 months or longer, and the amount of sediment formed during such storage, as well as the color of the oil, is determined. At the same time, another sample of the same oil containing the additive is stored under the same conditions and the sediment and color also are determined.

In another method of analysis, after storage at about 100° F., the different samples of the oil are passed through a 400 mesh wire screen and the time in seconds for successive 300 cc. portions of the oil to pass through the screen is recorded. This method analyzes the different samples as regards the property thereof to clog the burner screen in actual service. As hereinbefore mentioned, clogging of burner screens is objectionable because it prevents satisfactory use of the fuel oil.

The colors of the different samples were determined in a Lumetron, Model 402–E, spectrophotometer. Distilled water is rated as 100. A very dark oil would be rated as 0 in this analysis.

The properties of a sample of the oil not containing additive (control sample) and a sample of the oil containing 0.005% by weight of 1,3-dicyclohexyl-5-methyl-5-octadecenoyl-aminohexahydropyrimidine are reported in the following table:

*Table 1*

| Additive | Color after about 150 days | Sediment, mg/100 ml. | Time in seconds to pass through screen | | |
|---|---|---|---|---|---|
| | | | 1 | 2 | 3 |
| None | 25 | 11 | >200 | | |
| 1,3-dicyclohexyl-5-methyl-5-octadecenoyl-aminohexahydropyrimidine | 37 | 3.6 | 9 | 9 | 9 |

Before storage in the manner hereinbefore set forth, a sample of oil was free from sediment and had a color of 94. It will be noted that the additive served to benefit the oil in reducing the sediment after about 150 days of storage from 11 to 3.6 mg./100 ml. and to have a final color of 37 as compared to 25 for the control sample. Also, in the screen test, the sample without additive required over 200 seconds to pass through the screen, thus indicating plugging of the screen, whereas the sample containing the additive passed through the screen in 9 seconds.

EXAMPLE II

The additive used in this example was the condensation product of 1,3-dicyclohexyl-5-methyl-5-aminohexahydropyrimidine and "Empol 1066" dimer acid. This dimer acid is a dicarboxylic acid recovered as a by-product and is believed to contain an average of about 36 carbon atoms per molecule. This condensation was effected by refluxing the mixture in the presence of toluene solvent and continuing the refluxing until the theoretical amount of water of condensation was evolved.

0.005% by weight of this condensation product was utilized in another sample of the catalytic cycle oil described in Example I. A sample of this oil without additive and another sample of the oil with additive were tested in a recycle test wherein the oil was maintained at a temperature of 200° F. and continuously recycled through a filter. The number of hours required until a given pressure drop is reached is reported, and this indicates the properties of the oil to plug the filter.

The control sample (sample without additive) reached the inflection point (previously established pressure drop) in about 21 hours. On the other hand, the sample containing 0.005% by weight of the condensation product of 1,3-dicyclohexyl - 5 - methyl-5-aminohexahydropyrimidine and dimer acid did not reach the inflection point until 79 hours of recycling.

EXAMPLE III 1,3-diisopropyl-5-ethyl - 5 - decanoylaminohexahydropyrimidine is prepared by first reacting one mol of 1-nitropropane, two moles of isopropylamine and three mols of formaldehyde to form 1,3-diisopropyl-5-ethyl-5-nitrohexahydropyrimidine. This product is reduced to the corresponding amino compound and then is reacted with capric acid to form 1,3-diisopropyl-5-ethyl-5-decanoylhexahydropyrimidine.

EXAMPLE IV 1,3 - diisopropyl-5-methyl-5-dodecanoylaminohexahydropyrimidine is prepared by refluxing 1,3-diisopropyl-5-methyl acylaminohexahydropyrimidine with lauric acid in the presence of xylene solvent and continuing until the theoretical amount of water of condensation is evolved from the reaction. After completion of the reaction the products are cooled and the solvent is removed by distillation.

EXAMPLE V 1,3-di-sec-butyl-5-methyl - 5 - decanoyl-aminohexahydropyrimidine is prepared by refluxing in the presence of toluene solvent a mixture of 1,3-di-sec-butyl-5-methyl--aminohexahydropyrimidine with capric acid until the theoretical amount of water of condensation is evolved, following which the products are cooled and the solvent removed by distillation.

EXAMPLE VI

The myristic acid salt of 1,3-dicyclohexyl-5-methyl-5-octadecenoyl-aminohexahydropyrimidine is prepared by commingling these reactants and stirring at ambient temperature for one hour. The product is recovered as a viscous liquid.

EXAMPLE VII 1,3 - diisopropyl - 5 - methyl-5-dodecanodyl-aminohexahydropyrimidine prepared as described in Example IV is mixed with an equal molar proportion of VR-1 Acid to form the VR-1 Acid salt of 1,3-diisopropyl-5-methyl-5 - dodecanoyl-aminohexahydropyrimidine. As hereinbefore set forth, VR-1 Acid is a dibasic acid containing an average of about 36 carbon atoms per molecule. The mixing is conducted at 100° F. for a period of 45 minutes and the product is recovered as a viscous liquid.

I claim as my invention:

1. A compound having the formula

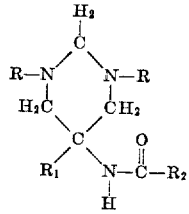

wherein R and $R_3$ are alkyl and $R_1$ is lower alkyl.

2. 5 - Alkanoylaminohexahydropyrimidine.

3. 1,3 - Dicyclohexyl-5-alkyl-5-alkanoylaminohexahydropyrimidine.

4. 1,3-Dicyclohexyl-5-methyl - 5 - octadecenoylaminohexahydropyrimidine.

5. 1,3 - Dialkyl - 5 - alkyl-5-alkanoyl-aminohexahydropyrimidine.

6. 1,3 - Diisopropyl-5-methyl-5-dodecanoylaminohexahydropyrimidine.

7. 1,3 - Sec-butyl-5-methyl-5-decanoyl-aminohexahydropyrimidine.

8. Myristic acid salt of 1,3-dicyclohexyl-5-methyl-5-octadecenoyl-aminohexahydropyrimidine.

References Cited in the file of this patent

Hackh's Chemical Dictionary, 3rd ed., pp. 12–13 (1944).

Schmidt: Organic Chemistry, 7th ed., pp. 380-2 (1955).